United States Patent Office 2,917,540
Patented Dec. 15, 1959

2,917,540

ALKANE BIS-SULFINIC ACIDS

John T. Shaw, Middlesex, John F. Hosler, Bound Brook, and Michael T. Beachem, Franklin Township, Somerset County, N.J., assignors to American Cyanamid Company, New York, N.Y., a corporation of Maine No Drawing. Application May 27, 1958
Serial No. 738,046

9 Claims. (Cl. 260—500)

This invention relates to bis-sulfinic acids represented by the formula:

$$HO_2S\text{—}R\text{—}SO_2H$$

where R is selected from the group consisting of aliphatic and cycloaliphatic hydrocarbon residues containing more than 3 carbon atoms and in which the two sulfinic acid groups are attached to different carbon atoms.

Typical hydrocarbon residues represented by R are as follows: tetramethylene; 1-methyltetramethylene; hexamethylene; 2-methyltetramethylene; 1,4-dimethyltetramethylene; decamethylene; 1-n-octylethylene; 1-n-pentylpentamethylene; 1-ethyl-1,5,5-trimethylpentamethylene; 3 - n - pentylpentamethylene; 2,7-dimethyloctamethylene; 1,4-di-n-propyltetramethylene; undecamethylene; 1-methyldecamethylene; 3-methylundecamethylene; 3-ethylundecamethylene; 1,1,8,8-tetramethyloctamethylene; dodecamethylene; tridecamethylene; 3-methyldodecamethylene; 2-methyldodecamethylene; 1-methyldodecamethylene; tetradecamethylene; 2-methyltridecamethylene; 3-methyltridecamethylene; pentadecamethylene; 2,12-dimethyltridecamethylene; 3 - methyltetradecamethylene; 2,13 - dimethyltetradecamethylene; heptadecamethylene; octadecamethylene; 1,4-cyclohexylene; and 1,3-cyclopentylene.

Compounds of the present invention are useful as intermediates for the preparation of chemicals for use in imparting wrinkle resistance to textile fabrics. For this purpose the compounds are reacted with formaldehyde to give the corresponding hydroxymethyl derivatives. Some of the compounds are also polymerization catalysts.

The lower limit on the number of carbon atoms in the saturated hydrocarbon chain represented by R in the formula is extremely critical. With less than four carbon atoms the products are not stable and cannot be practically made into wrinkle-resistant textile finishes. It is not known why the limit on carbon atoms is so critical and no theory is advanced in explanation of the unique properties possessed by compounds of the present invention.

While the present invention is not limited in its product aspects to any particular process of making the alkane bis-sulfinic acids, in a more specific aspect an improved process forms a part of the present invention. This process involves a reduction of corresponding sulfonyl chlorides which may be obtained by chlorination of the sodium salt of the corresponding sulfonic acids or alkyl isothiouronium salts. Preferably the reduction is effected with sodium sulfite in which case the bis-sulfinic acids are produced in the form of their sodium salts. They may easily be isolated either as such or by forming a less soluble salt such as a zinc or magnesium salt. The metal salts after isolation may be dried, further purified if desired, and then transformed into the free acid, or the moist metal salt may be dissolved in water and acidified to produce the free acid which is then obtained by cooling and filtration.

The limitation that the sulfinic acid groups are not attached to the same carbon atom is vital as the desirable properties of the compounds of the present invention are not obtained if it is attempted to introduce two sulfinic acid groups on the same carbon atom, in other words, an alkylidene bis-sulfinic acid. Such compounds do not have the desirable characteristics of compounds of the present invention nor can they be prepared by the preferred process described above.

In general the bis-sulfinic acids of the present invention are easily isolated which is virtually impossible with the corresponding ethane bis-sulfinic and as pointed out above, good yields are obtained by reaction with formaldehyde whereas no useful yields of even very impure formaldehyde derivatives of 1,2 ethane-bis-sulfinic acid can be obtained.

The invention will be described in greater detail in conjunction with the specific examples in which the parts are by weight unless otherwise specified. As was discussed above and will be observed from these examples, when R in the general formula represents the residue of an aliphatic hydrocarbon radical, the —SO$_2$H groups are separated by at least four carbon atoms in a straight chain.

EXAMPLE 1

1,4 butane-bis-sulfinic acid $$HO_2S(CH_2)_4SO_2H$$

To a solution of 65.5 parts of anhydrous sodium sulfite in 310 parts of water is added 128 parts of magnesium sulfate heptahydrate. A heavy precipitate is formed. The mixture is then heated to 40° C. and 51 parts of 1,4-butane-bis-sulfonyl chloride is added, care being taken that the reaction mixture remains alkaline to Brilliant Yellow-Red which is effected by the addition of suitable amounts of solid magnesium hydroxide, the amount being of the order of magnitude of 23 parts. During the addition the temperature is maintained between 40 and 50° C. and is effected with agitation which is continued at the same temperature until the reaction is substantially complete. Thereupon, the reaction mixture is cooled down with stirring to room temperature and finally chilled and the solid product removed by filtration and dried. The product analyzes as a magnesium salt of 1,4-butane-bis sulfinic acid. The yield is excellent, but the product at this point contains extensive inorganic impurities.

93 parts of the crude magnesium butane-bis-sulfinate described above and 100 parts of water is added to 140 parts of diethyl ether. The mixture is stirred and cooled to 5° C. and then 50 parts of 5 M sulfuric acid is added very gradually with stirring. A solid product of the free acid forms between the two liquid layers and constitutes 1,4 butane-bis-sulfinic acid with a melting point of 122–126° C. The product is not completely pure and upon recrystallization, colorless crystals are obtained.

EXAMPLE 2

1,4 butane-bis-sulfinic acid $$HO_2S(CH_2)_4SO_2H$$

A mixture of 100 parts of water, 26.5 parts of sodium sulfite and 86.1 parts of sodium bicarbonate is heated and stirred at 45–50° C. until solution is complete. Thereupon, 25.5 parts of 1,4 butane-bis-sulfonyl chloride is added gradually. At the end of the addition, the pH is 7.5 and the solution which is slightly cloudy is stirred for a further period of time at 70–80° C. until the reaction is complete. The cloudy reaction mixture is then filtered at 50° C. and the clear filtrate cooled to 5° C. and acidified by the gradual addition of 22 parts of concentrated hydrochloric acid. A solid precipitates which is filtered off and dried and after recrystallization from water is identified as pure 1,4 butane-bis-sulfinic acid.

EXAMPLE 3

*1,4 butane-bis-sulfinic acid*

$$HO_2S-(CH_2)_4-SO_2H$$

A slurry of 330 parts of sodium sulfite, 453 parts of sodium bicarbonate and 1250 parts of water is stirred at 45–50° C. and 132 parts of 1,4 butane-bis-sulfonyl chloride gradually added. After the addition is complete, the reaction mixture is heated to 75–85° C. and maintained until reaction is complete. Thereupon, the mixture is cooled down to room temperature and the solid product which forms is removed by filtration. The solid product constitutes relatively insoluble, inorganic salts and is discarded. The filtrate resulting is added to a solution of 510 parts of zinc chloride and 400 parts of water. Copious white precipitate forms, is filtered off and washed with a small amount of water. The product is a crude zinc salt of butane 1,4-bis-sulfinic acid. This crude product is then dissolved in 530 parts of 1:1 hydrochloric acid solution being accelerated by gentle warming on a steam bath. The mixture is then filtered hot which removes further slight amounts of inorganic salts and the filtrate cooled to 5° C. A colorless crystalline precipitate comes down which is removed by filtration, washed with water and dried and constitutes 1,4 butane-bis-sulfinic acid.

EXAMPLE 4

*Sodium salt of butane -1,4-bis-sulfinic acid*

A slurry of 25.5 parts of butane-1,4-bis-sulfonyl chloride, 58 parts of sodium sulfite and 50 parts of water is stirred at 10–20° C. until reaction is substantially complete. During the reaction the pH is maintained essentially neutral by the gradual addition of sodium hydroxide. An aqueous solution of the sodium sult of butane-1,4-bis-sulfinic acid is obtained.

EXAMPLE 5

*1,5 pentane-bis-sulfinic acid*

$$HO_2S(CH_2)_5SO_2H$$

450 parts of 1,5-pentane-bis-sulfonyl chloride is added to a slurry of 422 parts of sodium sulfite, 563 parts of sodium bicarbonate and 1675 parts of water at 40–50° C. The reaction mixture is then heated to 75–85° C. and maintained at this temperature until the reaction is substantially complete, whereupon the reaction mixture is cooled down to room temperature and some insoluble matter precipitating out by filtration. To 1525 parts of the filtrate there is slowly added a solution of 479 parts of zinc chloride and 500 parts of water. Considerable frothing occurred and the white precipitate forms making stirring difficult and requiring the addition of a further 400 parts of water. After the precipitation is complete, the solid product is removed by filtration, dried and 270 parts of a dried material dissolved in 180 parts of 2:1 hydrochloric acid warming somewhat to effect solution. The solution is clarified hot and the filtrate cooled to −10° C. The solid product precipitates out which is filtered off and recrystallized twice from a small amount of 1:1 hydrochloric acid water mixture. Recrystallization is continued until the product melts at 94–95° C. It is then dried over phosphorus pentoxide and becomes very waxy and the melting point drops to 72–86° C. Analysis, including infrared analysis, shows that the product is pure 1,5-pentane-bis-sulfinic acid.

EXAMPLE 6

*1,10-decane-bis-sulfinic acid*

$$HO_2S(CH_2)_{10}SO_2H$$

A solution of 100 parts of 1,10-dibromdecane and 360 parts of anhydrous ethanol is prepared and 47.1 parts of thiourea added and the mixture refluxed until the reaction is complete. Thereupon the volume is concentrated at reduced pressure to about half and 150 parts of anhydrous diethyl ether added with stirring. A colorless precipitate forms which is removed by filtration, washed with ether and dried. It is 1,10-decane-bis-pseudothiuronium bromide.

147 parts of 1,10-decane-bis-pseudothiuronium bromide, prepared above, is dissolved in 1500 parts of water. The solution is maintained at 25–30° C. and anhydrous chlorine is passed in. The mixture becomes light yellow and a colorless crystalline solid produce separates. This is removed by filtration, washed with water to give a creamy colored solid product which is crude 1,10-decane-bis-sulfonyl chloride.

A slurry is prepared of 108.3 parts of sodium bicarbonate, 79.5 parts of sodium sulfite and 300 parts of water. The slurry is stirred at 45–55° C. and the crude 1,10-decane-bis-sulfonyl chloride prepared above is added gradually. After the addition is complete, the reaction mixture is heated to 75–85° C. and maintained at this temperature until reaction is substantially complete. The mixture is then cooled to room temperature and insoluble salts forming are removed by filtration. The filtrate on standing overnight at room temperature deposits a precipitate which redissolves on warming. To the clear filtrate is added a solution of about 400 parts of 1:1 hydrochloric acid which causes a colorless precipitate to come down. This is filtered off and dried giving a product melting at 91–101° C. which is very soluble in methanol, ethanol, isopropanol and dioxane and fairly soluble in acetonitrile, but insoluble in diethyl ether and in benzene. Analysis by infrared shows that the product is a disulfinic acid and is uncontaminated by sulfonic acid groups.

EXAMPLE 7

*2-methylbutane -1,4-bis-sulfinic acid*

$$\underset{\underset{CH_3}{|}}{HO_2SCH_2-CH-CH_2-CH_2SO_2H}$$

The procedure of Example 2 is repeated except that 26.9 parts of 2-methyl-butane-1,4-bis-sulfonyl chloride is used in place of the 25.5 parts of 1,4-butane-bis-sulfonyl chloride. The 2-methylbutane-1,4-bis-sulfonyl chloride is obtained from 1,4-dibromo-2-methylbutane by conversion to the disulfonyl chloride by the Strecker synthesis with alkyl halide and an alkali metal sulfite. The disulfonyl chloride is then obtained by treating the sodium salt of the disulfonic acid with phosphorus pentachloride.

EXAMPLE 8

*2,5-hexane-bis-sulfinic acid*

$$\underset{\underset{CH_3}{|}}{HO_2S-CH}-CH_2-CH_2-\underset{\underset{CH_3}{|}}{CH-SO_2H}$$

The procedure of Example 2 is followed except that 28.3 parts of 2,5-hexane-bis-sulfonyl chloride is used in place of the 25.5 parts of 1,4-butane-bis-sulfonyl chloride. The product obtained is 2,5-hexane-bis-sulfinic acid.

EXAMPLE 9

*1,4-butane bis-hydroxymethyl sulfone*

$$(CH_2)\!\!\begin{array}{c}{\diagup}SO_2CH_2OH\\{\diagdown}SO_2CH_2OH\end{array}$$

6.88 parts of 37% aqueous formaldehyde is added to 5.7 parts of 1,4-butane-bis-sulfinic acid prepared according to Example 1. The temperature rises spontaneously to about 50° C. and is maintained at this temperature with cooling. After the exothermic reaction subsides, a white slurry is obtained and is stirred and heated for an addition period until the reaction is complete. The solid product is removed by filtration after cooling the mixture to room temperature.

A bath of 5 parts of the above 1,4-butane-bis-hydroxymethyl sulfone, 1.6 parts magnesium chloride and 93 parts of water are formed into a bath in which a piece of 80 square cotton fabric is padded. The fabric is removed, squeezed to about 100% wet pickup, dried 3 minutes at 220° F. and cured for 1½ minutes at 350° F. The fabric thus treated has a greatly improved resistance to wrinkling as compared to the untreated fabric.

The bis-hydroxymethyl sulfone is not claimed in the present invention and is shown as constituting a product which can be prepared from the bis-sulfinic acids of the present invention. This product is described and claimed in the co-pending application of Shaw, Beachem and Scalera, Serial No. 674,603, filed July 29, 1957.

EXAMPLE 10

*1,4-cyclohexane-bis-sulfinic acid*

The procedure of Example 2 is followed except that 28.1 parts of 1,4-cyclohexane-bis-sulfonyl chloride is used in place of the 25.5 parts of 1,4-butane-bis-sulfonyl chloride.

EXAMPLE 11

When it is attempted to prepare 1,2-ethane disulfinic acid or 1,3-propane disulfinic acid by the procedure of Example 3 using the corresponding disulfonyl chlorides, no precipitates form at all with zinc chloride in the case of the 1,2-ethane disulfonyl chloride and it is not possible to isolate 1,3-propane disulfinic acid.

EXAMPLE 12

*1,12-dodecane-bis-sulfinic acid*

$$HO_2S—(CH_2)_{12}—SO_2H$$

The procedure of Example 6 is followed except that 109 parts of 1,12-dibromdodecane is used in place of 100 parts of 1,10-dibromdecane. A similar product, 1,12-dodecane-bis-pseudothiuronium bromide, is obtained.

In the second step the procedure is also the same as in Example 6 with 160 parts of 1,12-dodecane-bis-pseudothiuronium bromide is used in place of 147 parts of 1,10-decane-bis-pseudothiuronium bromide. A similar product is obtained.

EXAMPLE 13

*1,18-octadecane-bis-sulfinic acid*

$$HO_2S—(CH_2)_{18}—SO_2H$$

The procedure of Example 6 is followed except that 137 parts of 1,18-dibromoctadecane is used in place of 100 parts of 1,10-dibromdecane, and 188 parts of 1,18-octadecane-bis-pseudothiuronium bromide is used in place of 147 parts of 1,10-decane-bis-pseudothiuronium bromide. A similar product is obtained.

This application is in part a continuation of my co-pending application Serial No. 674,602 filed on July 29, 1957, now abandoned.

We claim:
1. Bis-sulfinic acids represented by the formula

$$HO_2S—R—SO_2H$$

in which R is selected from the group consisting of aliphatic hydrocarbon radicals of from four to eighteen carbon atoms and cycloaliphatic hydrocarbon radicals of five and six carbon atoms, the SO₂H groups being separated by a straight chain of at least four carbon atoms.
2. 1,4-butane-bis-sulfinic acid.
3. 1,5-pentane-bis-sulfinic acid.
4. 2-methylbutane-1,4-bis-sulfinic acid.
5. 2,5-hexane-bis-sulfinic acid.
6. 1,10-decane-bis-sulfinic acid.
7. 1,4-cyclohexane-bis-sulfinic acid.
8. 1,12-dodecane-bis-sulfinic acid.
9. 1,18-octadecane-bis-sulfinic acid.

References Cited in the file of this patent

Truce et al.: Chem. Review 48, 69–124, February 1951.